United States Patent [19]

Manber et al.

[11] 4,394,076
[45] * Jul. 19, 1983

[54] INDICIA RECORDING APPARATUS

[75] Inventors: Solomon Manber, Sands Point; David Chiang, Dix Hills; Mosi Chu, Setauket, all of N.Y.

[73] Assignee: Amtech Patent Licensing Corp., No. Miami Beach, Fla.

[*] Notice: The portion of the term of this patent subsequent to Jan. 12, 1998, has been disclaimed.

[21] Appl. No.: 282,279

[22] Filed: Jul. 10, 1981

Related U.S. Application Data

[63] Continuation of Ser. No. 173,966, Jul. 31, 1980, Pat. No. 4,310,226.

[51] Int. Cl.³ .................. B41B 21/08; G01D 9/38; H04I 15/34
[52] U.S. Cl. ............................. 354/5; 178/15; 346/110 R
[58] Field of Search .............. 346/110; 178/15; 354/4-6; 355/1, 40, 41, 64, 73

[56] References Cited

U.S. PATENT DOCUMENTS

| | | | |
|---|---|---|---|
| 2,394,435 | 2/1946 | Finch | 346/110 R X |
| 2,736,770 | 2/1956 | McNaney | 178/15 |
| 3,464,330 | 9/1969 | Lewis | 354/4 |
| 3,534,384 | 10/1970 | Hutchins | 346/110 |
| 3,677,643 | 7/1972 | Sagawa | 355/73 X |
| 3,689,932 | 9/1972 | Gerber | 346/110 R X |
| 3,692,935 | 9/1972 | Manber | 178/15 |
| 3,796,489 | 3/1974 | Sone et al. | 355/64 UX |
| 3,863,262 | 1/1975 | Crofut et al. | 354/5 |
| 3,930,251 | 12/1975 | Salava et al. | 354/5 X |
| 4,310,226 | 1/1982 | Manber et al. | 354/5 |

FOREIGN PATENT DOCUMENTS 1180914 2/1970 United Kingdom .................. 354/6

Primary Examiner—Donald A. Griffin
Attorney, Agent, or Firm—Hane, Roberts, Spiecens & Cohen

[57]  ABSTRACT

Apparatus for recording characters on a photographic record medium including spaced feed and takeup reels for carrying a roll of the medium. A support such as a cylinder is disposed between the reels supports the record medium. A carriage is controllably movable opposite the support and in a direction transverse to the direction of record medium movement. A recording head on the carriage has a radiation emitter device for emitting intensity modulated radiation toward the cylindrical support along a scan line which makes an angle with the direction of the transverse movement.

12 Claims, 5 Drawing Figures

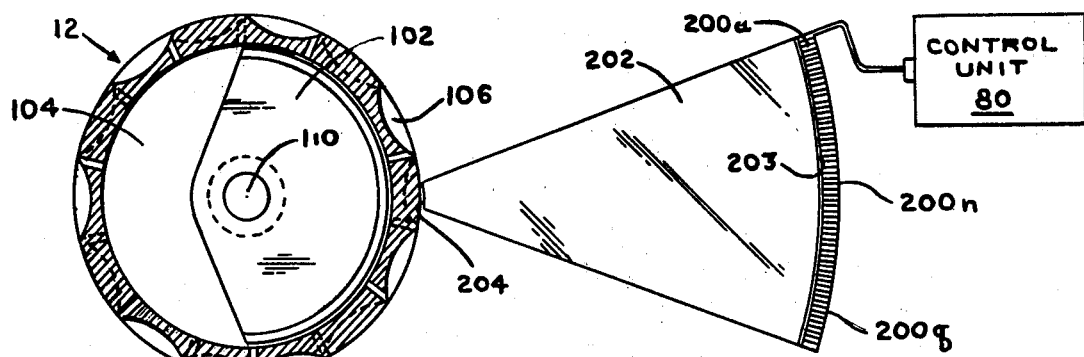
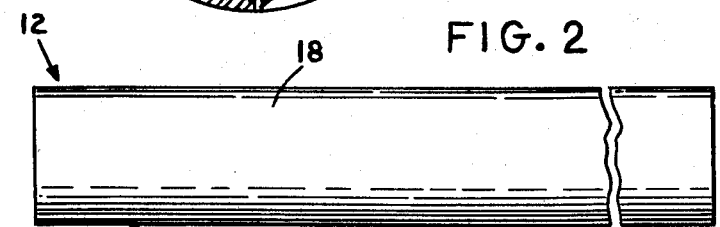
FIG. 2
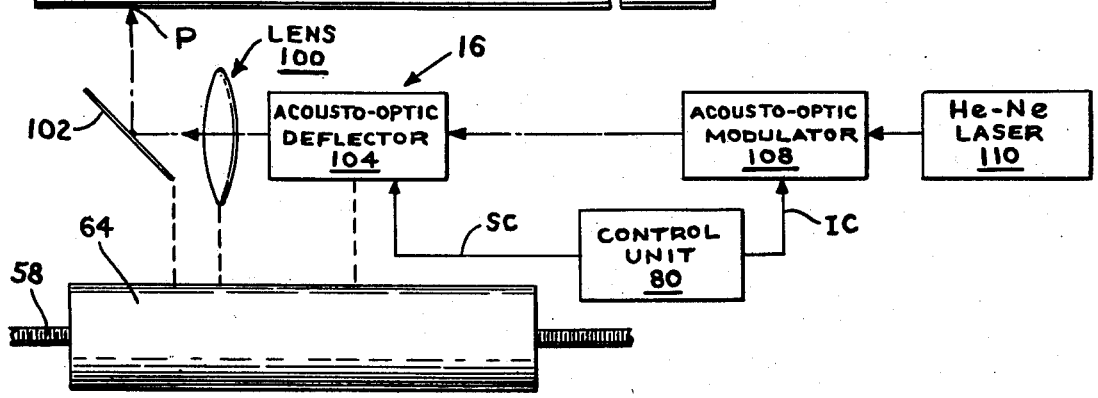
FIG. 3
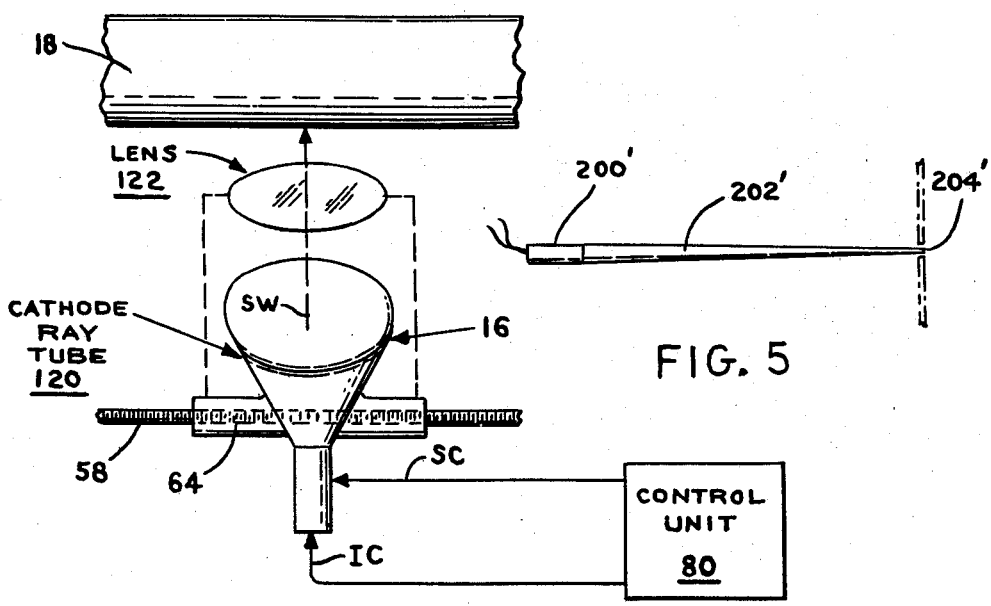
FIG. 5
FIG. 4

INDICIA RECORDING APPARATUS

This application is a continuation of application Ser. No. 173,966 filed July 31, 1980 and now U.S. Pat. No. 4,310,226.

BACKGROUND OF THE INVENTION

This invention pertains to indicia recording apparatus and more particularly to such apparatus which records indicia on a photo-sensitive record medium through the agency of a light emitting means.

A very common kind of non-impact recording device utilizes photo-techniques wherein a light source is used to record on a photo-sensitive surface whether it be a photographic film or a xerographic medium. One common device is a photo-typesetter or pattern generator. Generally such devices employ a cathode ray tube which is raster scanned and intensity modulated to produce the patterns of light that are exposed to a photographic film. While such devices have performed admirably they have the limitation of being able to record on only a relatively narrow width of film. Generally such devices can "print" on widths of up to about 11 or 12 inches utilizing fixed optical techniques. There have been proposals to increase the recording width by using complex optical systems with pluralities of fixed and moving mirrors as well as prisms to obtain the width. Such systems are shown in my U.S. Pat. Nos. 3,562,718 and 3,621,137. While such systems work in theory they are difficult to fine tune to the point where the separate projections abut. In order to solve that problem my U.S. Pat. No. 3,692,935 utilizes a cylindrical support medium for the record medium. The support medium is rotated while a cathode ray tube is focused on its surface. In order to obtain line-by-line recording the entire support medium is axially moved after the recording of each line. This solution presents several problems. First of all, the mechanical movement of the support medium is quite complex since the structure itself is massive. In addition continuous feeds of a whole roll of film are not possible since the drum will only support a single sheet of film.

SUMMARY OF THE INVENTION

It is a general object of the invention to provide improved indicia recording apparatus which while being extremely simple can record on unusually large widths of a record medium. Briefly, the invention contemplates indicia recording apparatus which includes a supply reel for storing a roll of record medium, a takeup reel for accumulating record medium removed from the supply reel and a supporting means intermediate the reels for supporting the record medium. A carriage means which is controllably movable opposite the supporting means in a direction transverse to the path of travel of the record medium carries a recording head having means for emitting intensity-modulated radiation toward the supporting means along a plurality of equilength scan lines which are in planes intersecting the supporting means.

BRIEF DESCRIPTION OF THE DRAWING

Other objects, features and advantages of the invention will be apparent from the following detailed description when read in conjunction with the accompanying drawing which shows the presently preferred embodiment of the invention. In the drawing:

FIG. 2 is a cross-sectional view through the line 2—2 of FIG. 1;

FIG. 3 is a top view of another embodiment of the recording apparatus of FIG. 1;

FIG. 4 is a top view of another embodiment of the recording apparatus of FIG. 1; and FIG. 5 is a side view of one of the light emitting elements of the apparatus of FIG. 1.

DETAILED DESCRIPTION

Figure 1:
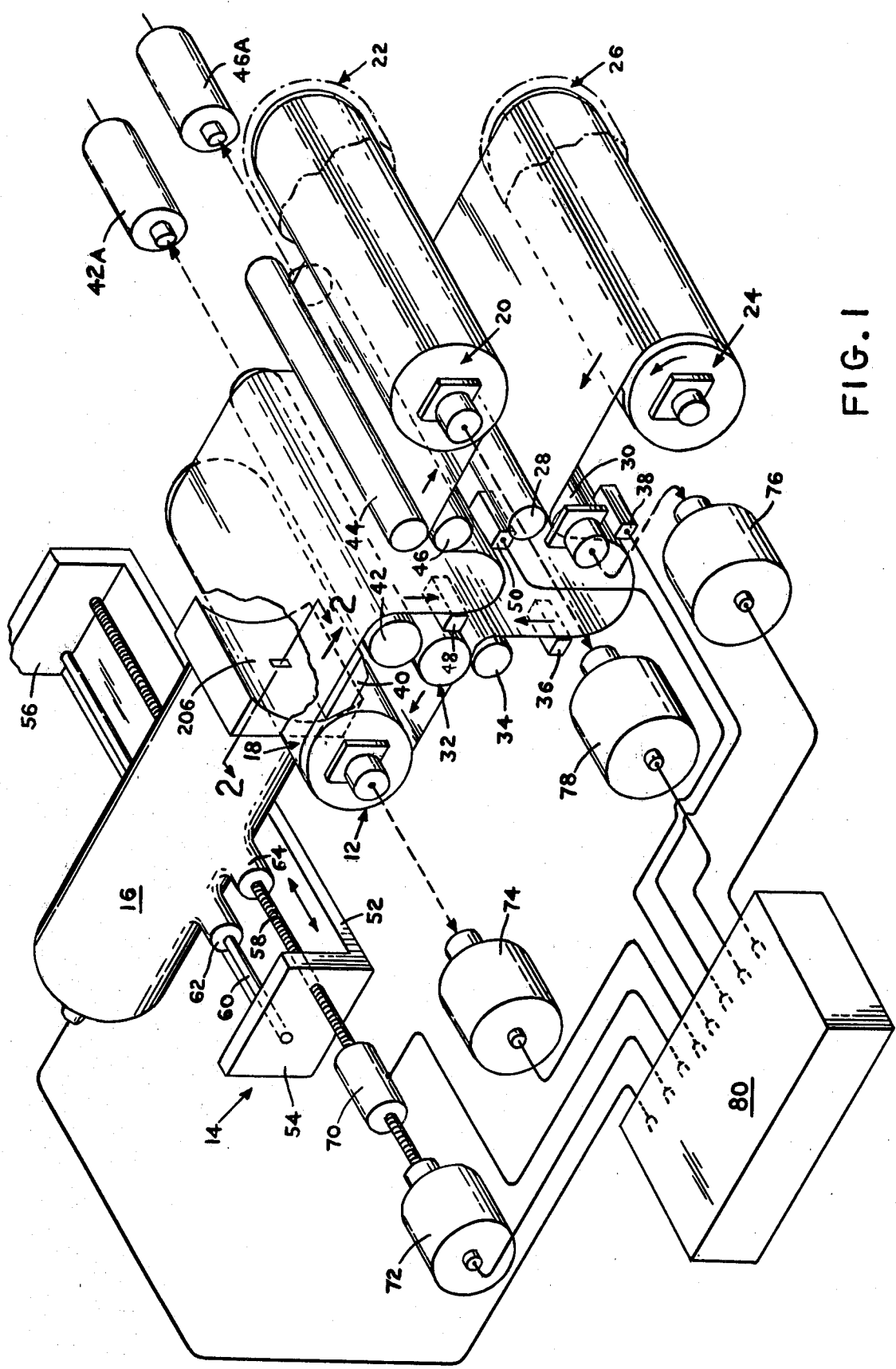
FIG. 1 is a perspective view of the indicia recording apparatus in accordance with the invention.

The indicia recording apparatus according to the invention is embodied in FIGS. 1 and 2 as a photo-typesetter 10. The photo-typesetter includes a cylindrical supporting means in the form of vacuum cylinder 12 for a record medium 18 and a carriage means 14 upon which rides a recording head 16. A record medium 18 is mounted on a supply roll 24 within a cassette 26 and is taken up on a take-up roll 20 within another cassette (not shown). The record medium exits the cassette 22 and passes through a supply loop forming means. The supply loop forming means includes the opposed idle roller 28 and the controllably driven roller 30, and the self-centering idle roller 32 opposite the idle roller 34. Associated with the loop-forming means is a light emitter 36 and a light sensor 38.

When the film leaves the vacuum cylinder 12 it moves over a flat film support 40 to a take-up loop forming means. The take-up loop forming means includes the self-centerline roller 42 which is driven by motor 42A to rotate at a constant high speed so that the film will slip. The remainder of the take-up loop forming means includes the idling roller 44 opposite a clutch driven roller 46 driven by motor 46A which supplies tension for wrapping the film onto the take-up reel 24. Included with the take-up loop forming means is a loop sensor again in the form of a light emitter 48 and a light sensor 50.

The carriage means 14 includes a support base 52 from which extends the upright members 54 and 56. The upright members are spaced sufficiently to span the width of the vacuum cylinder 12. Extending between the support members 54 and 56 are a lead screw 58 and a rail 60. Disposed about the rail 60 is a sleeve 62 which carries the recording head 16. Extending from the recording head 16 is a bracket carrying a threaded sleeve 64. Thus, as the lead screw rotates the recording head is transversely driven opposite the record medium or film 18. Connected to the lead screw is a rotary shaft encoder 70 of conventional design which emits a pulse for each predetermined fractional rotation of the shaft. The shaft is driven by the stepping motor 72.

Similarly, the vacuum cylinder 12 is driven by the stepping motor 74 and take-up roller 20 is driven by the stepping motor 78. The stepping of these motors is controlled by the control unit 80. In addition, the control unit 80 supplies the indicia for the recording by the recording head 16.

Since the control unit 80 does not constitute part of the invention it will not be described in detail. Only its overall operation will be discussed. In general, the control unit 80 first emits a signal to the stepping motor 74 to cause it to rotate sufficiently so that a new line of film is available for the record head. Then, assuming that the recording head 16 is at one end of the travel, it is then driven towards the opposite end. During this time, signals are fed to the recording head 16 from the control unit 80. These signals energize light sources therein to expose the opposed area of film. At the end of the line the control unit 80 then energizes the stepping motor 74 to drive the film to make available a new line for exposure. Either the recording head 16 is driven back to the opposite side of the medium before recording begins again or else the recording can begin in the opposite direction. In this way the recording is performed.

However, at the same time and not necessarily synchronous therewith film is supplied to the supply loop and taken out of the take-up loop. In particular, the roller 30 has its motor 30A energized whenever the light sensor 38 can "see" the light emitter 36. During that time the sensor 38 sends back a signal to the control unit 80 which causes the motor 30A to rotate and pull film from the supply cassette. As soon as the loop is long enough to block the light path between the emitter 36 and the sensor 38 the motor 76 is stopped. It should be noted that the emitter 36 and the sensor 38 are positioned close to the edge of the film which normally is not recorded on.

Normally the take-up roller 20 is at rest. However, whenever the light sensor 50 does not see light from the light emitter 48 it sends a signal back to the control unit 80 which then causes the stepping motor 78 to rotate and draw film into the cassette. This rotation is continuous until light is sensed by the sensor 50 indicating that the take-up loop is less than a given length. At that time take-up stops. The take-up and supply loops act as buffers to provide minimum inertia load of the film to the vacuum roller 12.

The vacuum roller 12 (FIG. 2) is basically a hollow cylinder within which is fixed a semi-circular support cylinder 102. This configuration provides a vacuum chamber 104 within the vacuum cylinder 12. The surface of the vacuum cylinder 12 is provided with channels, a typical channel being channel 106. These channels communicate via passageways such as 108 to the vacuum region in the cylinder. Vacuum is applied by means of the passageway 110 connected via tubing, to a vacuum pump (not shown).

One embodiment of the recording head 16 is seen in FIGS. 1 and 2. The recording head is built up from a plurality of light emitting elements. In particular, each element includes a light source preferably a light emitting diode 200 whose output end is positioned opposite the arcuate surface of a pie-shaped laminar lens 202 and aimed along a radius vector thereof. The output end of the lens 202 is positioned opposite the surface of cylinder 102. The lens is essentially planar and is at right angles to the vacuum cylinder 12 of FIG. 1. However, it may be preferable that the plane make an oblique angle therewith. In such case the distance between "spots" along the axis is then lessened by the cosine of the angle. More importantly, it has been found that to enhance the focusing of the light onto the record medium the end 204 of lens 202 lies along an arc of a circle which conforms with the curvature of the roller 12. As seen in FIG. 2, the arc is matingly opposite and slightly spaced from the surface of the cylinder 12. If there is a problem with "run out" of the cylinder 12 it is desirable to back off the end of the arcuate demarcation and interpose a lens system. The light emitting diodes 200a to 200q are arranged in a linear array which is preferably concave facing the input end of lens 202. If it is too difficult to produce an arc shaped substrate, then the array can be a set of groups of diodes in short rectilinear pieces with the pieces lined up polygonally to approximate an arc.

In FIG. 3 there is shown the preferred embodiment of the recording head 16 which includes the focussing lens 100, the mirror 102 and the acousto-optic deflector 104, acting as a vertical plane deflector, mounted on bearing 64, and the acousto-optic moudulator 108, acting as an intensity modulator, and the laser 110 of the helium-neon type mounted remotely from the carriage 64. In operation, a continuous beam of light is emitted from laser 110, via modulator 108, to deflector 104. Signals on line IC from control unit 80 turn the beam on and off in accordance with the stroke to be recorded. The intensity modulated light passes through deflector 104 and is focused by means of lens 100 and mirror 102 onto the record medium 18 supported by cylinder 12. Control unit 80 generally feeds a saw tooth signal via line SC to the modulation input of deflector 104. If one assumes for the minute that the beam passing out of modulator 108 is a continuous one, then the action of deflector 104 is to write an arc defined by the intersection of a plane perpendicular to the axis of cylinder 12 with the surface of the cylinder at the point P. The length of the arc is a function of deflection of the beam by deflector 104. Thus single line scans which are intensity modulated are written on medium 18 to form the strokes of a character.

The laser 110 is a conventional helium-neon laser. With other types of lasers it is possible to mount the laser and modulator 108 directly on the carriage. It is also possible for certain low data rates to use deflector 104 for both the intensity modulation and the scanning deflection. A suitable device for both functions separately or combined is Model 1205 Acousto-Optic Modulator manufactured by ISOMET of Springfield, Va. 22151.

In FIG. 4 there is shown a further embodiment of the recording head 16 utilizing the cathode-ray tube 120 and the focusing lens 122 mounted on bearing 64. Control unit 80 emits a sawtooth deflection signal via line SC to the vertical deflection elements of tube 120 for causing a repetitive single line sweep as represented by line SW. This sweep is intensity modulated by signals from control unit 80, via a line IC, to the intensity output of the tube 120.

In FIG. 5 there is shown an alternate embodiment of the diode-lens combination of FIG. 2. In this embodiment the lens is replaced by a plurality of optical fibre elements, each element being associated with one diode. As shown in FIG. 5 a typical element 202' is tapered with its input end opposite the diode 200' and is narrower outpute end 204' opposite the cylinder 12.

Although the indicia recording apparatus has been shown utilizing photographic film the fundamental concept of the invention can also be used for xerographic devices. In such case the film transport mechanisms are deleted and the vacuum cylinder 12 is replaced by a roller having a smooth surface covered with a xerographic material. The remainder of such a device would then include the source of toner and the paper drive mechanisms for making the copies. The embodiment of FIG. 3 is eminently suited for such an application.

While only a limited number of the embodiments of the invention have been shown and described in detail there will now be obvious to those skilled in the art many modifications and variations satisfying many or all of the objects of the invention without departing from the spirit thereof as defined by the appended claims. In particular, although the supporting means is shown as a cylinder, it could equally be a flat planar bed.

What is claimed is:

1. Indicia recording apparatus comprising: a supply reel for storing a roll of record medium; a takeup reel for accumulating record medium removed from said feed reel; a supporting means intermediate said supply and takeup reels, for supporting a portion of the record medium, a carriage means controllably and repeatedly movable opposite said supporting means and in a direction transverse to the travel of the record medium, and a recording head on said carriage means, said recording head comprising radiation emitting means for emitting intensity modulated radiation toward said supporting means along a plurality of equilength scan lines, each of said scan lines being in a different plane intersecting said supporting means whereby during a single traverse of said carriage means a transverse band of the record medium is scanned.

2. The indicia recording apparatus of claim 1 wherein said radiation emitting means is at least one linear array of light emitting devices.

3. The indicia recording apparatus of claim 2 further including means for focusing the light from said light emitting devices onto a surface which substantially conforms to a portion of the surface of said supporting means.

4. The indicia recording apparatus of claim 1 wherein said carriage means comprises drive support means, a lead screw means supported by said drive support means along an axis parallel to the axis of said supporting means and carrying said recording head, and motor means connected to said lead screw means whereby said recording head can be driven opposite the surface of the record medium.

5. The indicia recording apparatus of claim 1 further comprising a record medium, said record medium being a layer of xerographic material.

6. The indicia recording apparatus of claim 1 further comprising a record medium, said record medium being a photographic film.

7. The indicia recording apparatus of claim 1 wherein said record medium is a roll of photographic film.

8. The indicia recording apparatus of claim 7 wherein each of said reels is in a cassette means.

9. The indicia recording apparatus of claim 1 wherein said radiation emitting means comprises a cathode-ray tube means.

10. The indicia recording apparatus of claim 9 wherein said cathode-ray tube means performs a repetitive single line scan.

11. The indicia recording apparatus of claim 1 wherein said radiation emitting means comprises laser means remote from said carriage means and deflecting means on said carriage means for deflecting the radiation from said laser means toward the surface of said supporting means.

12. Indicia recording apparatus comprising: a source of a record medium; an accepting means for accepting record medium removed from said source; a supporting means intermediate said source and said accepting means, for supporting a portion of the record medium, a carriage means controllably and repeatedly movable opposite said supporting means and in a direction transverse to the travel of the record medium, and a recording head on said carriage means, said recording head comprising radiation emitting means for emitting intensity modulated radiation toward said supporting means along a plurality of equilength scan lines, each of said scan lines being in a different plane intersecting said supporting means whereby during a single traverse of said carriage means a transverse band of the record medium is scanned.

* * * * *